United States Patent Office 3,342,795
Patented Sept. 19, 1967

3,342,795
FERRICHRYSIN, DESFERRICHRYSIN, AND DERIVATIVES THEREOF
Ernst Gaeumann, deceased, late of Zurich, Switzerland, by Tino Gaeumann, legal representative, Zurich, Switzerland, and Vladimir Prelog, Zurich, and Ernst Vischer, Basel, Switzerland, assignors to Ciba Corporation, New York, N.Y., a corporation of Delaware
Filed Mar. 19, 1964, Ser. No. 353,151
Claims priority, application Switzerland, Nov. 24, 1961, 13,754/61; Mar. 2, 1962, 2,579/62; June 15, 1962, 7,220/62; Aug. 13, 1962, 9,687/62; Oct. 11, 1962, 12,052/62; Mar. 21, 1963, 3,603/63
18 Claims. (Cl. 260—112.5)

This is a continuation-in-part of our application Ser. No. 239,193, filed Nov. 21, 1962 and now abandoned.

The present invention relates to the growth promoting substances ferrichrysin and desferrichrysin and derivatives thereof.

A considerable number of ferriferous growth-promoting substances for example the ferrichromes, coprogen and the ferrioxamines, have already been isolated from materials of biological origin, more especially from microorganisms.

The present invention is based on the observation that new strains of Aspergillus, namely *Aspergillus melleus* M 2853 and *Aspergillus terreus* M 4785, produce a new ferriferous growth-promoting substance, ferrichrysin, and the corresponding iron-free compound, desferrichrysin. Accordingly, the present invention provides ferrichrysin, desferrichrysin and derivatives and salts of these compounds, as well as a process for their manufacture and it includes also the new strains *Aspergillus melleus* M 2853 and *Aspergillus terreus* M 4785.

Ferrichrysin is a red brown, crystalline substance which is readily soluble in water and methanol, even in the cold, and less readily in absolute ehtanol. The compound has the following elementary composition: $C=43.37\%$, $H=6.08\%$, $N=16.72\%$, $Fe=7.09\%$, $O=26.74\%$ (calculated). The ultraviolet spectrum in water displays a maximum at 420 m$\mu$ $$(\log E^{1\%}_{1\,cm.} = 1.48)$$

Figure 1:
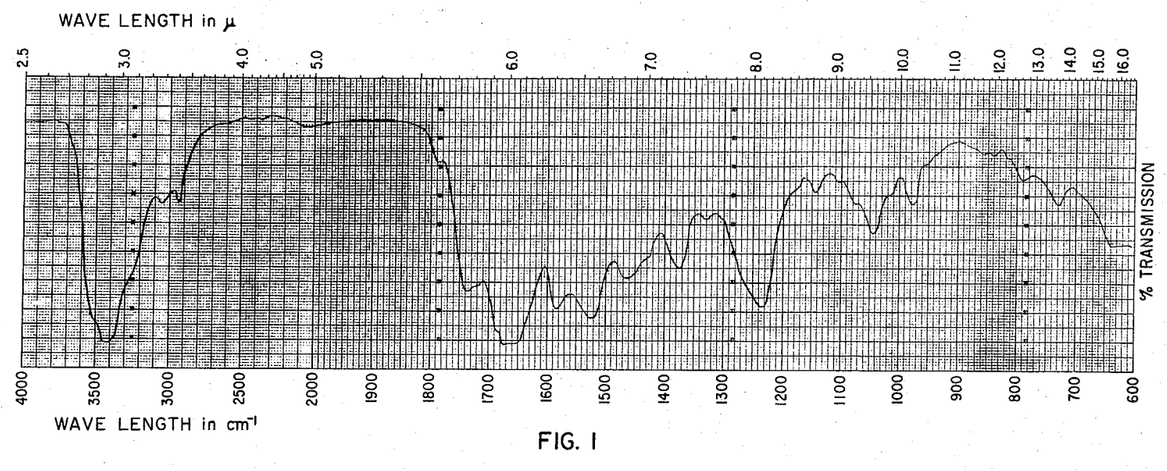
FIG. 1: Infrared spectrum of ferrichrysin in potassium bromide.

The infrared spectrum in potassium bromide solution contains bands, inter alia, at 725, 783, 975, 1060, 1140, 1200 (shoulder), 1218 (shoulder), 1237, 1275 (shoulder), 1340 (shoulder), 1368, 1430 (shoulder), 1445 (shoulder), 1465, 1495 (shoulder), 1517, 1585, 1652, 2930, 3070 (shoulder) and 3420 cm.$^{-1}$; see FIGURE 1.

At about 270° C. the crystals turn black and decompose without melting. The paper chromatogram reveals the following Rf values:

System I: (n-butanol:glacial acetic acid:water, 4:1:1) 0.26
System II: (tertiary butanol: 0.004 N-hydrochloric acid: saturated sodium chloride solution 2:1:1; paper impregnated with acetone:water:saturated aqueous sodium chloride solution, 6:3:1) 0.34

When subjected to acid hydrolysis, ferrichrysin gives off as volatile products 3 mols of acetic acid. (Succinic acid and 1-amino-5-hydroxylamino-pentane, which are essential ingredients of the ferrioxamines, cannot be detected in the hydrolysis mixture of ferrichrysin).

When ferrichrysin is treated with a base for instance an alkali metal hydroxide, e.g. sodium hydroxide or an acid, especially a strong mineral acid, e.g. hydrochloric acid or sulfuric acid or a substance capable of forming iron complexes, such as 8-hydroxyquinoline, the iron is removed from the molecule and desferrichrysin is formed. Desferrichrysin is a colorless powder which has so far not been possible to prepare in crystalline form; it is readily soluble in water, methanol and ethanol, more sparingly soluble in butanol, and substantially insoluble in acetone, chloroform and lipophilic solvents. Its elementary analysis reveals the following values: $C=46.36\%$, $H=6.98\%$, $N=15.65\%$, $O=31.01\%$ (calculated), corresponding to the empiric formula $C_{29}H_{49}N_9O_{14}$. The ultraviolet spectrum is not particularly characteristic and displays only a final absorption at 214 m$\mu$. In the infrared spectrum (measured in potassium bromide solution) there appear bands, inter alia, at 2.94, 3.43, 6.10, 6.53, 7.04, 7.32, 8.10, 8.30, 8.62, 9.60 and 10.14$\mu$; see FIGURE 3.

The nuclear magnetic resonance spectrum of desferrichrysin in trifluoracetic acid reveals the following signals:

|  | Parts per million |
|---|---|
| Broad maximum corresponding to 4n protons; CH$_2$ groups | 2.07 |
| Singlet corresponding to 3n protons; methyl in acethydroxamic acid groupings | 2.54 |
| Broad maximum corresponding to 2n protons | 4.00 |
| Broad bunch of bands with recognizable maxima at 4.33, 4.83 and 5.00 parts per million; total about 3n protons | 4.2 to 5.1 |
| Corresponding to about 3n protons; peptidic NH | 8.02 |

The number n in the above data is probably 3, corresponding to the probably identical 3 basic units making up the molecule.

When ferric chloride is added to a solution of desferrichrysin, a deep violet-red coloration appears. From the reaction solution ferrichrysin can be isolated. When desferrichrysin is hydrolyzed with 6 N-hydrochloric acid and the hydrolysis products are catalytically hydrogenated (to reduce possibly present hydroxylamino groups), there are obtained, apart from 3 mols of acetic acid, three ninhydrin-positive products which reveal in the paper chromatogram with phenol:water (4:1) as eluant the Rf values 0.21, 0.30 and 0.38 respectively. Examination by the method of Moore and Stein (D. H. Spackman, W. H. Stein, S. Moore, Analytical Chemistry, 30, page 1190 [1958]) reveals that these compounds are ornithine, serine and glycine in the molecular ratio of 3:2:1. When the acid hydrolysate is examined as it is, without subsequent catalytic hydrogenation, ornithine cannot be identified.

It appears that in ferrichrysin the amino-acids glycine (1 mol), serine (2 mols) and δ-hydroxyornithine (3 mols) are linked together to form a cyclic peptide. The hydroxyornithine is N(δ)-acetylated and iron is bound in complex union to the 3-hydroxamic acid residues thus formed. The total formula of iron-free ferrichrysin is accordingly:

cyclo - [glycyl - (seryl)$_2$-(N$^\delta$-acetyloxyornithyl)$_3$]. Ferrichrysin corresponds to the structural Formula I and desferrichrysin to the Formula II in which formulae $R_1$ stands for hydrogen and $R_2$ for methyl.

The derivatives have the Formula I or that of the corresponding iron-free compound ($Fe^{3+}$ replaced by three hydrogen atoms with formation of hydroxylamine groups) in which $R_1$ represents hydrogen or an acyl radical, especially a lower alkanoyl radical, and $R_2$ a lower alkyl radical having 1–6 carbon atoms, more than one carbon atom being required if $R_1$ is hydrogen.

Ferrichrysin, desferrichrysin and the above-named analogues promote the growth of various micro-organisms and may therefore be used in the cultivation of such organisms. The following table shows the relative growth of *Microbacterium lacticum* Strain ATCC 8181, measured by the extinction of the culture, on addition of varying amounts of ferrichrysin to the culture medium:

TABLE

| Time in hours | Ferrichrysin in γ/liter | | | | |
|---|---|---|---|---|---|
| | 0 | 1 | 10 | 31.6 | 100 |
| 22 | 0.177 | 0.230 | 0.362 | 0.459 | 0.319 |
| 25 | 0.222 | 0.280 | 0.512 | 0.802 | 0.644 |
| 28 | 0.244 | 0.330 | 0.598 | 0.941 | 0.974 |
| 31 | 0.249 | 0.342 | 0.645 | 1.040 | 1.115 |
| 46 | 0.257 | 0.359 | 0.788 | 1.346 | 1.503 |

Ferrichrysin and ferriferous derivatives of Formula I possess anti-anaemic properties and may thus be used as medicaments. Desferrichrysin and other iron-free compounds corresponding to Formula II likewise have voluable pharmacological properties: Inter alia, they inhibit the deposition of ferriferous pigments in the tissue and, in cases of pathological deposition of iron in the organism, cause the secretion of iron, for example in conditions of haemochromatosis and haemosiderosis.

Like other sideramines, ferrichrysin is capable of antagonizing competitively the antibacterial action of antibiotics, belonging to the group of the sideromycins toward gram-positive pathogens (antisideromycin action).

Insofar as the afore-mentioned biological properties are concerned ferrichrysin somewhat resembles other sideramines, such, for example, as the ferrioxamines, ferrichromes and coprogen. On the other hand, it differs in its physico-chemical properties in a characteristic manner from those substances, as is shown below:

(1) From the ferrioxamines, which are produced by Actinomycetes strains, ferrichrysin differs not only in that neither succinic acid nor 1-amino-5-hydroxy-aminopentane can be identified in the hydrolysis products but also in its spectroscopic properties: Thus, its infrared spectrum differs from that of the ferrioxamines in essential features and the maximum of the ultraviolet spectrum of ferrichrysin appears at a shorter wavelength (about 420 mμ) compared with about 430 mμ in the case of the ferrioxamines.

(2) Ferrichrome, which can be produced from a culture of *Ustilago sphaerogena*, differs only slightly from ferrichrysin in its spectroscopic properties. In the infrared spectrum of ferrichrome a medium strong maximum appears to 1275 cm.$^{-1}$ which, in the case of ferrichrysin, turns up only as a weak shoulder. Instead of a broad band at 1060 cm.$^{-1}$ in the case of ferrichrysin, there appear two distinctly separate maxima at 1025 and 1068 cm.$^{-1}$ with ferrichrome. The nuclear magnetic resonance spectrum of desferrichrysin contains a broad maximum at 4.00 parts per million and a broad bunch of bands in the area 4.2 to 5.1, with maxima at 4.33, 4.83 and 5.00 parts per million, while iron-free ferrichrome displays in the region maxima at 4.33, 4.52 (shoulder) and 4.74 parts per million. On the other hand, ferrichrysin and ferrichrome differ considerably in the solubility: Ferrichrome, in contrast to ferrichrysin, is almost insoluble in cold methanol and dissolves only after prolonged boiling in about 1000 times its own amount of methanol. The hydrolysates are likewise different: Iron-free ferrichrome, hydrolysed with 6 N-hydrochloric acid and then catalytically hydrogenated, furnishes instead of three only two ninhydrin-positive products, namely glycone and ornithine. Also in the paper chromatograms there are differences: Ferrichrome displays in systems I and II of R$f$ values 0.19 and 0.25 respectively.

(3) Ferrichrome A, which accompanies ferrichrome, displays in contrast to ferrichrysin no appreciable antagonistic action towards ferrimycin. On hydrolysis it furnishes instead of 3 mols of acetic acid 3 mols of β-methylglutaconic acid. In the paper chromatogram in system I and II ferrichrome A reveals the R$f$ values of 0.12 and 0.18 respectively; accordingly, it migrates only about half as far as ferrichrysin. Finally, ferrichrome A displays a behavior different from that of ferrichrysin in the Craig distribution: In the system benzyl alcohol: n-butanol: saturated aqueous sodium chloride solution:0.001 N-aqueous hydrochloric acid (9:9:5:15), distributed over 95 stages it becomes enriched in stages 3 to 15, whereas ferrichrysin turnsh up in fractions 36 to 60.

(4) Of coprogen neither the infrared-spectrum nor any hydrolysates are known. The elementary composition, however, is clearly different from that of ferrichrysin. The composition claimed for coprogen is: C=50.9%, H=6.9%, N=10.2%, Fe=6.7%. Coprogen decomposes already at 205° C. In the paper chromatogram coprogen reveals the R$f$ values 0.43 in system I and 0.55 in system II.

Ferrichrysin and desferrichrysin are obtained when *Aspergillus melleus* M 2853 or *Aspergillus terreus* M 4785 or mutants of these strains capable of forming ferrichrysin are cultivated under aerobic conditions in an aqueous nutrient solution containing a source of carbon and of nitrogen as well as inorganic salts. From the culture filtrate ferrichrysin and/or desferrichrysin are/is isolated and, if desired, ferrichrysin is converted into the iron-free compound or derivatives or salts of these compounds are prepared. Like other sideramines, ferrichrysin and/or desferrichrysin are/is formed in substantial amounts only when the producer strain is cultivated in a deficiency of iron, that is to say in a nutrient solution containing less iron than is normally used for cultivating micro-organisms. To ensure a good yield of ferrichrysin and/or desferrichrysin it is therefore necessary to keep the iron content in the nutrient medium low.

Strain *Asperigillus melleus* M 2853 was isolated from the air and strain *Aspergillus terreus* M 4785 from the soil. The two strains are kept in our own laboratories and at the Federal Institute of Technology, Institute for Special Botany, Zurich, under the said reference numbers. When they are cultivated on malt extract-agar the two strains are distinguished by a vegetative mycelium of septated and branched hyphae from whose foot cells sprout conidia carrier in the form of round. swollen heads. These are densely covered with fertile cells, the sterigmae, from which the conidiae are constricted in unbranched chains by formation of transverse partitions. This identifies the two strains unambiguously as belonging to the genus *Aspergillus micheli* 1729 (see Thom and Church "The Aspergilli," Baltimore, 1926). Further classification follows the method described by Thom and Raper in "A Manual of the Aspergilli," Baltimore, 1945. The group to which these organisms belong may be determined either by color characteristics or by morphological criteria: Both methods establish that Strain M 2853 belongs to the group of *Aspergillus ochraceus*. Within the *Aspergillus ochraceus* group classification is based above all on the color of the sporulating mycelium, the formation of acelerotes and the form of the conidiae. The yellow color of the heads of the conidiae, the sparse appearance of sclerotes and the smooth, roundish conidiae typify the strain M 2853 as *Aspergillus melleus*.

The color and morphological features of Strain M 4785 prove that it belongs to the *Aspergillus terreus* group and within this group to the species *Aspergillus terreus* Thom.

Sources of carbon and nitrogen suitable for the cultivation of *Aspergillus melleus* M 2853 or *Aspergillus terreus* M 4785 are: Carbohydrates, for example glucose, saccharose, lactose, starches, alcohols such as mannitol and glycerol, amino acids, for example ornithine, peptides, proteins and their degradation products such as peptone or tryptone, meat extracts, water-soluble constituents of cereal grains such as maize or wheat, distiller's solubles, yeast, seeds (more especially of the rape, soybean or cotton plants), ammonium salts, nitrates and urea. Inorganic salts that may be present in the nutrient solution include chlorides, carbonates, sulphates or nitrates of alkali metals, alkaline earth metals, magnesium, zinc and manganese, as well as traces of iron ($<10^{-7}$ mol/liter).

The cultivation is carried out under aerobic conditions, for example in a quiescent surface culture, or preferably submerged, with shaking or stirring with air or oxygen in shaking flasks or in the known fermenters. A suitable cultivation temperature ranges from 18 to 40° C. and is preferably 27° C. Under these conditions the nutrient solution displays a substantial ferrichrysin action in general after 4 to 12 days.

The ferrichrysin activity can be determined microbiologically by the modified Bonifas test (see Zaehner and co-workers, Arch. Mikrobiol., 36, pages 325 et seq. [1960]), using as test solution a solution containing 0.01 mg. of ferrimycin per liter and as test strain *Staphylococcus aureus*.

Alternatively, the ferrichrysin concentration of the culture solution may be determined optically. For this purpose 5 ml. of culture solution are shaken for 5 minutes with 1.5 g. of sodium chloride, 1 ml. of ferric sulfate solution of 0.1% strength and 5 ml. of benzyl alcohol, then centrifuged, the organic phase is filtered and its extinction at 420 m$\mu$ is measured. As control substance an extract from a non-inoculated nutrient solution, otherwise prepared in identical manner, is used.

After 4 to 12 days the cultures reach an activity corresponding to 300 to 400 mg. of pure ferrichrysin.

1 g. of ferric chloride is added per liter of culture solution. Alternatively, this addition of iron may be made towards the end of the fermentation. The mycelium is separated from the culture filtrate, whereupon the bulk of the sideramine is found in the culture filtrate. Still, substantial amounts thereof adhere to the mycelium. It is therefore of advantage to wash the mycelium thoroughly, for example with water or with an aqueous alcohol, such as aqueous methanol.

The isolation of ferrichrysin from the culture filtrate may be performed by as such known methods, for example by one of those described below or by a combination thereof:

(1) There may be used adsorbents, for example active carbons such as norite, activated earths such as Frankonite, fuller's earth or Floridine, or resin adsorbers such as Asmite. The elution of the adsorbates is advantageously carried out with a mixture of a water-miscible organic solvent with water, for example with aqueous methanol, aqueous pyridine, dilute mixtures of acetic acid with methanol or water+methanol+glacial acetic acid+butanol. A Frankonite or notrite adsorbate can be eluted particularly advantageously with a mixture of 4 parts by volume of water and 1 part by volume of pyridine.

(2) Furthermore, ferrichrysin can be extracted from an aqueous solution with the use of an organic solvent. Particularly good results in such extractions have been achieved with higher organic alcohols, for example benzyl or isopropyl alcohol. In these extractions it is of advantage when the aqueous phase contains an inorganic salt, for example ammonium sulfate or sodium chloride. From the resulting organic extracts ferrichrysin can be isolated either by evaporation of the solvent or by precipitation with a suitable organic solvent, for example an ether, petroleum ether or ethyl acetate, in an enriched form.

(3) According to another method of enriching ferrichrysin it is distributed between an aqueous solution and a solution of phenol in chloroform; the content of phenol in the chloroform may be varied.

(4) Another method of enriching ferrichrysin is chromatography, such as adsorption chromatography on various materials, for example on norite, alumina, a magnesium silicate, silica gel, calcium sulfate, and distribution chromatography with cellulose, a starch, silica gel, Celite or the like as vehicle, or chromatography on an ion exchange resin, for example on Dowex-50, Amberlite IRC-50 or the like.

(5) Furthermore, ferrichrysin can be enriched by counter-current distribution according to Craig between two immiscible solvent phases, for which purpose the following system has provided particularly useful: n-butanol:benzyl alcohol:0.001 N-hydrochloric acid:aqueous sodium chloride solution saturated at 19° C. (9:9:15:5).

Desferrichrysin is formed by *Aspergillus melleus* M 2853 and *Aspergillus terreus* M 4785 in addition to ferrichrysin so that it can also be isolated directly from the culture filtrate. It is of advantage to remove during the isolation all iron present in the culture filtrate, for example by adding a substance capable of forming iron complexes, such as 8-hydroxyquinoline or ethylenediamine tetraacetic acid.

The substance capable of forming iron complexes may be added to the culture broth immediately after completion of the fermentation, though it is preferably added at a later stage of the processing to remove at the same time any ferric ions introduced by the reagents used.

The isolation of desferrichrysin from the culture solution is performed as described above for the isolation of ferrichrysin.

The ferriferous and iron-free derivatives of Formula I in which $R_1$ is an acyl radical and $R_2$ is methyl are obtained when ferrichrysin is treated with an acylating agent, more especially a lower alkanoylating agent, or when from a ferriferous acylated compound iron is eliminated. The derivatives in which $R_1$ is hydrogen and $R_2$ is lower alkyl other than methyl are obtained when desferrichrysin is desacylated in an acid medium, the resulting cyclic hexapeptide treated with a lower alkanoylating agent, the O-alkanoyl groups selectively split off, and, if desired, the resulting desferri compound converted into the ferriferous complex compound by means of iron (III) ions.

The treatment with a lower alkanoylating agent is performed in known manner, for example with an acid halide or acid anhydride of a lower alkanoic acid. The desacetylation of the iron-free compound is preferably performed in a mild acid medium, for example, in the presence of a dilute mineral acid, such as hydrochloric acid or sulfuric acid, while heating until hydroxamic acid can no longer be detected with iron chloride. O-acyl groups formed during the acylation of desferrichrysin can be split off, for example, with ammonia in methanol.

For conversion into the iron-free compounds, the iron complexes are treated with iron-binding substances e.g. 8-hydroxyquinoline, bases or acids. Iron-free compounds can be converted into iron complexes by means of soluble iron (III) salts, e.g. ferric chloride or ferric sulfate.

EXAMPLE 1

Strain *Aspergillus melleus* M 2853 is cultivated at 27° C. in a well aerated submerged culture in a nutrient solution containing per liter of tap water 20 g. of glucose, 5 g. of L-asparagine, 1 g. of secondary potassium phosphate, 1 g. of crystalline magnesium sulfate $$(MgSO_4 \cdot 7H_2O)$$

0.5 g. of calcium chloride and 2 mg. of zinc sulfate. The tap water contains 20 to 30γ of iron per liter. The nutrient solution is sterilized for 20 minutes at 120° C. The inoculation is performed with a spore suspension containing 150 to 180 million spores per liter.

After 4 to 8 days 1 g. of ferric chloride per liter is added to the cultures which are then filtered with addition of 2% of Celite. The culture filtrate is then mixed with 300 g. of sodium chloride per liter and the clear solution is extracted with 3× 0.1 volume of benzyl alcohol. The organic phase is dried with sodium sulfate and mixed with 3 volumes of ether. The benzyl alcohol+ether mixture is extracted with a small amount of distilled water until the aqueous phase has only a pale red coloration. The aqueous extract is lyophilized to furnish a red powder in a yield of 300 to 400 mg. per liter which contains 80% of the activity of the parent material.

18.9 of crude ferrichrysin mixture are subjected to a Craig distribution over 95 stages, the substances in the first 7 glasses being introduced into an automatic distribution apparatus (each glass having a capacity of 25 ml. per phase). The system used for the distribution is a maxture of benzyl alcohol, n-butanol, saturated aqueous sodium chloride solution and 0.001 N-aqueous hydrochloric acid in the volumetric ratio of 9:9:5:15.

The red-brown dyestuff is separated substantially into a main component and a secondary component which display their distribution maxima in fractions 46 and 75 respectively. This corresponds approximately to a distribution coefficient of $K_1=0.9$ and $K_2=3.8$.

Fractions 36 to 60 are combined, mixed with double the volume of ether, and the aqueous phase is separated. The organic layer is shaken three times with small amounts of water, and the combined aqueous extracts are approximately half saturated with sodium chloride and repeatedly extracted with phenol+chloroform (1 kg. phenol:1 liter chloroform). The extracts are washed with semi-saturated sodium chloride solution. The solution, which is at first turbid, is clarified through a short Celite column, then diluted with twice the volume of ether and repeatedly agitated with small amounts of water, whereupon the brown-red dyestuff returns to the aqueous phase.

The aqueous extracts are repeatedly washed with ether, evaporated under vacuum, and the residue is dried, to yield 8.2 g. of purified ferrichrysin. For crystallization 16 g. of such an evaporation residue are dissolved in about 200 ml. of hot absolute ethanol (distilled over sodium). Crystallization sets in very soon and there are obtained 11.6 g. of crystalline ferrichrysin in the form of small red-brown rods. This mother liquors are evaporated to dryness and redissolved in absolute alcohol, to yield another 0.9 g. of crystals.

For analytical purposes a specimen is recrystallized from absolute ethanol. The red-brown rods turn black at 270° C. but do not melt.

*Analysis.*—Found: C, 43.37%; H, 6.08%; Fe, 7.09%; N, 16.72%. Absorption spectrum in water: $\lambda_{max}=415$ m$\mu$ $$(\log E_{1\ cm.}^{1\%}=1.48)$$

When the alcohol used for the crystallization is not completely dry, there are obtained hydrates which are partially amorphous and partially crystallized in the form of irregular lumps.

Ferrichrysin is readily soluble both in water and in cold methanol. Amorphous ferrichrysin can be well taken up in absolute ethanol (up to about 5%), but from such a solution ferrichrysin soon settles out in red-brown, short rodlets which hardly undergo any felting on the suction filter. These crystals are only sparingly soluble in absolute alcohol after prolonged standing.

The infrared spectrum contains bands, inter alia, at 725, 783, 975, 1060, 1140, 1200 (shoulder), 1218 (shoulder), 1237, 1275 (shoulder), 1340 (shoulder), 1368, 1430 (shoulder), 1445 (shoulder), 1465, 1495 (shoulder), 1517 1585, 1652, 2930, 3070 (shoulder) and 3420 cm.$^{-1}$ (see FIGURE 1).

The paper chromatogram in system I (n-butanol:glacial acetic acid:water, 4:1:1) reveals the Rf value 0.26, in system II (tertiary butanol:0.04 N-hydrochloric acid:saturated aqueous sodium chloride solution, 2:1:1; paper impregnated with acetone:water:saturated aqueous sodium chloride solution, 6:3:1) the Rf value 0.34.

Ferrichrysin is also formed when strain *Aspergillus terreus* M 4785 is grown and the growth-promoting substance is isolated therefrom.

EXAMPLE 2

A solution of 4 g. of crystalline ferrichrysin in 100 ml. of water is mixed with 3 g. of 8-hydroxyquinoline in 36 ml. of methanol and stirred for 24 hours at room temperature. The black precipitate is then filtered off and the pale yellow filtrate is extracted 3 times with chloroform to remove any excess reagent. The aqueous phase is evaporated under vacuum. Yield: 3.3 g. of desferrichrysin in the form of an almost colorless residue. The product is readily soluble in water, methanol and ethanol, less so in butanol, and substantially insoluble in acetone, chloroform and lipophilic solvents. The elementary analysis reveals the following values: C=46.36%, H=6.98%, N=15.65%, O=31.01 (calculated), corresponding to the empirical formula $C_{29}H_{49}N_9O_{14}$. The ultraviolet spectrum is not particularly characteristic and contains only a final absorption at 214 m$\mu$. The infrared spectrum (measured in potassium bromide solution) contains bands, inter alia, at 2.94, 3.43, 6.10, 6.53, 7.04, 7.32, 8.10, 8.30, 8.62, 9.60 and 10.14$\mu$ (see FIGURE 3).

The nuclear magnetic resonance spectrum of this compound in trifluoroacetic acid contains the following signals:

| | Parts per million |
|---|---|
| Broad maximum corresponding to 4n protons; $CH_2$ groups | 2.07 |
| Singlet corresponding to 3n protons; methyl in acethydroxamic acid groupings | 2.54 |
| Broad maximum corresponding to 2n protons | 4.00 |
| Broad bunch of bands with recognizable maxima at 4.33, 4.83 and 5.00 parts per million; total about 3n protons | 4.2 to 5.1 |
| Corresponding to about 3n protons | 8.2 |

The number $n$ in the above data is probably 3, corresponding to the probably identical three basic units making up the molecule.

EXAMPLE 3

Aspergillus melleus M 2853 is grown submerged on a nutrient solution containing per liter of tap water 20 g. of glucose, 5 g. of L-asparagine, 1 g. of secondary potassium phosphate, 1 g. of crystalline magnesium sulfate ($MgSO_4 \cdot 7H_2O$), 0.5 g. of calcium chloride and 2 mg. of zinc sulfate. The nutrient solution is sterilized in the inoculation flasks or fermenters for 20 to 30 minutes under a pressure of 1 atmosphere (gauge), and inoculated with a spore suspension as in Example 1. Incubation is performed with vigorous shaking or stirring at 27° C., the cultures in the fermenters being aerated with about 2 volumes of air per volume of solution per minute. After about 96 hours' incubation the culture solution has attained its maximum content of desferrichrysin. This content is measured by the antisideromycin test. Since the nutrient solution contains a small amount of iron, the desferrichrysin formed is partially present in the form of its iron complex.

340 liters of active culture broth of Aspergillus melleus M 2853 are mixed with a solution of 85 g. of 8-hydroxyquinoline in 1.6 liters of methanol. After 1 hour, 2% of Hyflo Supercal is added as filter assistant and the mycelium is filtered off. To free the filtrate from excess 8-hydroxyquinoline it is percolated through a column with 5 liters of Amberlite IR–45 in the OH$^-$ form. The pH value of the percolate is adjusted to 7.5 by means of hydrochloric acid. The active culture solution obtained in this manner is then saturated with sodium chloride and extracted with benzyl alcohol. On evaporation of the extracts, desferrichrysin is obtained in the form of a slightly yellowish powder.

20 mg. of desferrichrysin in 1 ml. of 6 N-hydrochloric acid are heated for 3 hours and the evaporation residue is dissolved in ethanol of 96% strength and hydrogenated in the presence of a platinum oxide catalyst (Adams). In the reaction product 3 ninhydrin-positive products can be identified which reveal the respective Rf values of 0.21, 0.30 and 0.38 in the paper chromatogram eluted with phenol:water 4:1.

EXAMPLE 4

70 mg. of desferrichrysin are dissolved in 2 ml. of methanol and mixed with 40 mg. of crystalline ferric chloride in 2 ml. of methanol. The immediately appearing deep black coloration turns into orange-red on addition of a small amount of crystalline sodium acetate. This solution is evaporated to drynes under vacuum, and the residue is extracted with hot absolute alcohol and the sodium chloride is filtered off. The filtrate is evaporated, once more dissolved in 0.5 ml. of absolute alcohol, filtered, and allowed to crystallize at 0° C. Yield: 53 mg. of crystalline ferrichrysin which is found to be unitary in the paper chromatogram in two solvent systems and is identical with the original ferrichrysin.

A solution of 20 mg. of ferrichrysin in 3 ml. of 1.2 N-hydrochloric acid is heated for 5 minutes on a boiling waterbath, with the originally red-brown solution almost completely losing its color; it is evaporated to dryness under vacuum. Neither succinic acid nor 1-amino-5-hydroxylamino-pentane can be identified in the residue.

20 mg. of ferrichrysin are refluxed with sulfuric acid of 20% strength. The hydrolysis solution is distilled, while diluting it a few times with water. The filtrate, which is collected with efficient cooling, contains the volatile acids; it is neutralized to phenolphthalein with sodium hydroxide solution and evaporated to drynes under vacuum. On reacting the residue with para-phenylphenylacylbromide the residue yields the amount of para-phenylphenylacyl acetate corresponding to 3 mols of acetic acid.

20 mg. of desferrichrysin are heated for 3 hours with 1 ml. of 6 N-hydrochloric acid and the residue is dissolved in ethanol of 96% strength and hydrogenated in the presence of platinum oxide catalyst (Adams). In the reaction product 3-ninhydrin-positive products can be identified which reveal in the paper chromatogram with phenol+water (4:1) as eluant the Rf values 0.21, 0.30 and 0.38 respectively.

EXAMPLE 5

A mixture of 25 mg. of iron-free ferrichrysin, 1 ml. of concentrated hydrochloric acid and 1 ml. of water is heated for 20 hours at 110° C. The evaporation residue of the hydrolysis solution is dissolved in a small amount of water and diluted with 20 ml. of absolute alcohol. This solution is hydrogenated in the presence of 20 mg. of pre-hydrogenated platinum oxide to reduce hydroxylamino into amino groups. The hydrolysate is examined according to Moore and Stein (D. H. Spackman, W. H. Stein, S Moore, Analytical Chemistry 30, page 1190, [1958]). The amino-acids ornithine, serine and glycine are identified in the molecular ratio of 3:2:1.

EXAMPLE 6

Strain Aspergillus melleus M 2853 is grown on a nutrient solution prepared from

| | | |
|---|---|---|
| Glucose | g | 20 |
| Aspargine | g | 5 |
| $MgSO_4 \cdot 7H_2O$ | g | 1.0 |
| $CaCl_2$ | g | 0.5 |
| $K_2HPO_4$ | g | 1.0 |
| $ZnSO_4 \cdot 7H_2O$ | mg | 2 |
| Tap water | liters | 1 | with the addition of a varying amount of ferric sulfate. After 2 and 5 days respectively the ferrichrysin content is measured by the antagonism test and by measuring the extinction at 410 m$\mu$ (cultures saturated with sodium chloride, mixed with 1 mg. of ferric chloride per ml., extracted with an equal amount of benzyl alcohol, extract used for measuring), and in a parallel test the mycelium is weighed. The results are summarized in FIG. 2. On the abscissa the amount of ferric sulfate in $\gamma$ per liter added to the nutrient solution is shown, whereas on the ordinate the activity in mm. of modified Bonifas test is plotted. The full line represents the values on the 5th day and the broken line those on the 2nd day.

On addition of 80$\gamma$ of ferric sulfate per liter the formation of ferrichrysin drops from 550 mg. below 5 mg. per liter.

EXAMPLE 7

(a) 3.0 g. of ferrichrysin in 50 ml. of methanol are treated at intervals of 30 minutes with 60, 30 and 30 ml. of acetic anhydride, and stirred for 5 hours at 15° (while cooling with tap water). The reaction mixture is evaporated in vacuum, the residue dissolved in about 20 ml. of methanol, and the product precipitated with ether. The resulting orange-brown, amorphous powder is dried under reduced pressure over calcium chloride. The yield is 3.33 g. of O,O'diacetyl-ferrichrysin (FIG. 1, $R_1$=acetyl, $R_2$=methyl). The IR spectrum of the compound in potassium bromide is shown in FIG. 1. The constitution of the iron complex can be seen from the NMR spectrum of the desferri compound which apart from the singlet of the three N-acetyl groups at $\delta$=2.15 p.p.m. (9 hydrogen atoms), also present in the spectrum of desferrichrysin, shows another singlet at $\delta$=2.10 p.p.m., which corresponds to 6 protons and must be attributed to the two O-acetyl groups. This signal is lacking with desferric-ferrichrysin. In paper chromatography the acetylation product shows higher $R_f$ values than the starting material:

|  | System I | | System II |
|---|---|---|---|
|  | On filter paper | Chromato-plate silica gel |  |
| Ferrichrysin | 0.40 | 0.170 | 0.36 |
| Diacetyl derivative | 0.61 | 0.225 | 0.61 |

System I: n-butanol+glacial acetic acid+water 4:1:1
System II: tertiary butanol+0.004 N - hydrochloric acid+saturated aqueous sodium chloride solution 2:1:1; paper impregnated with acetone+water+saturated aqueous sodium chloride solution 6:3:1.

Figure 2:
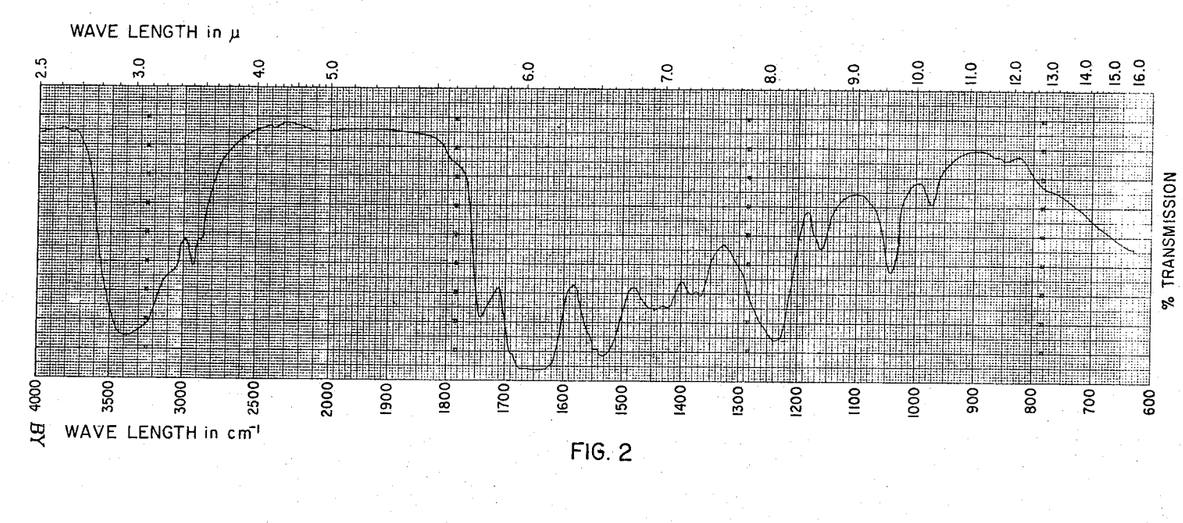
FIG. 2: Total activity in mm. of modified Bonifas-test obtained when *Aspergillus melleus* M 2853 is cultivated for 2 days (broken line) or 5 days (full line) in the presence of various amounts of iron (in γ/liter).

(b) 1.50 g. of the above acetylation product are dissolved in 50 ml. of water, and a solution of 2.0 g. of 8-hydroxyquinoline in 20 ml. of methanol added. The mixture is stirred at room temperature for 24 hours. The black precipitate is then filtered off and the pale yellow filtrate extracted with chloroform 5 times to eliminate the excess reagent. The aqueous solution is evaporated under reduced pressure and 1.30 g. of a nearly colorless, pulverulent residue obtained which is the practically pure desferri compound O,O'-diacetyl-desferrichrysin. FIG. 2 shows its IR spectrum in potassium bromide. The NMR spectrum in heavy water shows the following signals:

| (p.p.m.) | Splitting | Number of Hydrogen Atoms | Classification |
|---|---|---|---|
| 1.77 | b | 12 | $\beta$- and $\gamma$-CH$_2$ in hydroxy ornithine radicals. |
| 2.10 | s | 6 | 2 O-acetyl groups. |
| 2.14 | s | 9 | 3 N-acetyl groups. |
| 3.66 | b | 6 | $\delta$-CH$_2$ in hydroxyornithine radicals. |
| 3.95 | b | 2 | CH$_2$ in glycine radical. |
| 4.5 | b | 9 | $\alpha$-CH in serine radicals and hydroxy ornithine radicals. $\beta$-CH$_2$ in serine. |

EXAMPLE 8

(a) Desferrichrysin 18.42 g. of ferrichrysin are dissolved in 500 ml. of water, and a solution of 25 g. 8-hydroxyquinoline in 250 ml. of methanol added. The mixture is stirred at room temperature for 24 hours. A black crystalline precipitate of ferric 8-hydroxyquinoline forms which is filtered off with suction. The filtrate is agitated several times with chloroform to eliminate the excess reagent. The aqueous solution is evaporated under reduced pressure (in a rotary evaporator) and 16.87 g. of desferrichrysin obtained in the form of a yellowish amorphous foam. NMR spectrum in heavy water (D$_2$O):

| $\delta$ (p.p.m.) |  | n | Classification |
|---|---|---|---|
| 1.78 | b | 12 | $\beta$- and $\gamma$-CH$_2$ in $\delta$-N-hydroxy-ornithine. |
| 2.12 | s | 9 | CH—CO—. |
| 3.5-4.1 | b | 12 | $\delta$-CH$_2$ of $\delta$-N-hydroxyornithine. $\alpha$-CH$_2$ of glycine. $\beta$-CH$_2$ of L-serine. |
| 4.35 | b | 5 | $\alpha$-CH of L-$\delta$-N-hydroxy-ornithine and L-serine. |
| 4.70 | s |  | HOD (through exchange of OH- and NH-protons for D$_2$O). |

(b) Propionic acid analogon of ferrichrysin 665 mg. of desferrichrysin are dissolved in 20 ml. of N-hydrochloric acid. The solution is heated in a boiling water bath. Every 5 minutes a drop of it is placed on a staining plate and mixed with a drop of an about 2% methanolic ferrric chloride solution. At first, a strongly violet color reaction appears (hydroxamic acid). After a hydrolysis period of about 20 minutes, the iron chloride reaction is negative. The solution is evaporated under reduced pressure and leaves a nearly colorless, amorphous, strongly hygroscopic residue. With iron (III) chloride solution, the substance gives no color reaction. In the NMR spectrum the singlet at about 2.1 p.p.m. is lacking which in the starting material indicates the presence of acetyl groups.

The product is treated with 2 ml. of propionic anhydride and 10 ml. of pyridine, and the mixture left to itself at room temperature for 6 hours. It is then evaporated to dryness under reduced pressure. The residue is dissolved in 50 ml. of methanol which had previously been saturated with ammonia at 0° C. After being allowed to stand for 6 hours, first at 0° C., then at room temperature, the batch is evaporated. The oily residue is taken up in about 70 ml. of methanol and a solution of 600 mg. of crystalline iron (III) chloride in 15 ml. of methanol added. The mixture quickly turns deep violet (iron hydroxamate in acid solution), and on addition of about 500 mg. of crystalline sodium acetate and shaking becomes red-orange (ferric hydroxamate in about neutral solution). The reaction mixture is left to itself for 4 hours, then evaporated under reduced pressure. The crude product is not quite unitary and is therefore subjected to the Craig distribution for purification: Solvent system n-butyl alcohol+water 1:1. 170 stages. Fully automatic distribution apparatus with a capacity of 50 ml. per tube. Three red-brown maxima appear in the stages 18–20, 40 and 94.

For working up, the colored fractions are treated with ether in order to displace the sideramine into the aqueous phase. The latter is separated and the organic layer agitated 2–4 times with water. The combined aqueous extracts are treated with about 10% sodium chloride and then extracted exhaustively by agitation with phenol+chloroform (1 kg.:1 liter). The phenol-chloroform extracts are washed twice with half-saturated aqueous sodium chloride solution and filtered through a column of Celite (registered trademark). The clear filtrates are treated with twice their volume of ether and extracted exhaustively with distilled water. The aqueous extracts are washed several times with ether and evaporated to dryness under reduced pressure. The following quantities of substance are obtained from the various fractions:

Fractions 14–28: 151 mg.; mixture of several substances, readily soluble in water, difficultly in methanol. No activity to speak of.

Fractions 32–50: 336 mg. of amorphous powder, unitary according to paper chromatography. Propinoyl analogon of ferrichrysin.

Fractions 83–103: 86 mg. Considerably higher Rf values in the paper chromatogram than for the substance from fractions 32–50. This by-product probably still contains an O-acetyl group on a hydroxyl oxygen atom of a serine radical.

Figure 3:
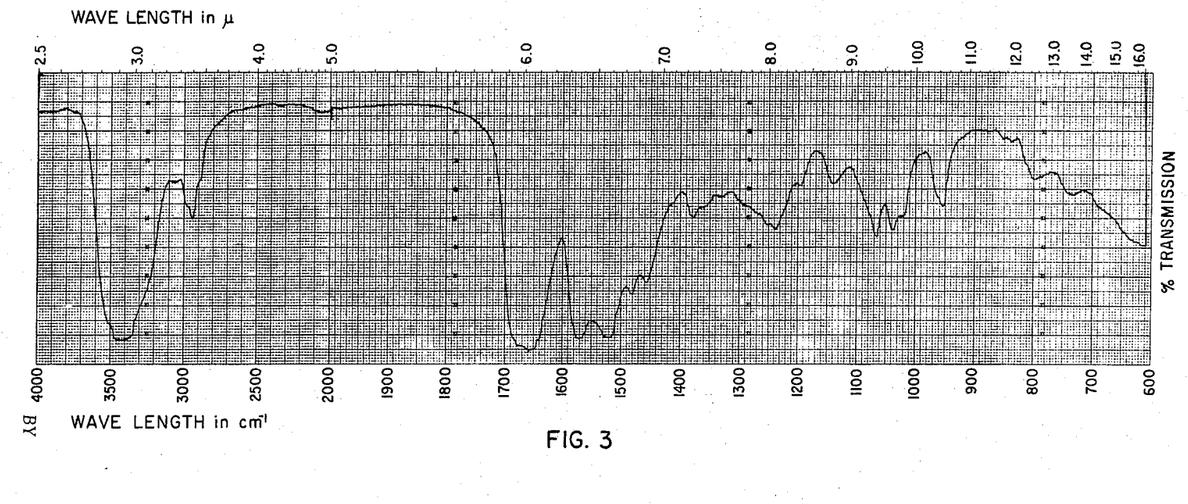
FIG. 3: Infrared spectrum of desferrichrysin in potassium bromide.

The main product of the Formula I, obtained from fractions 32–50, in which $R_1$ represents hydrogen and $R_2$ ethyl, does not crystallize. Its paper-chromatographic behavior is shown in Table 1. FIG. 3 shows the IR absorption spectrum in potassium bromide.

EXAMPLE 9

150 mg. of desferrichrysin are desacetylated with N-hydrochloric acid as described in Example 8. In the presence of 3 ml. of pyridine, the resulting product is reacted with 0.5 ml. of butyric acid anhydride, and the O-acyl groups split off with methanolic ammonia in the manner described in Example 8. The iron complex is prepared with 200 mg. of iron (III) chloride in methanol. The crude product is dissolved in water and extracted three times by shaking with n-butyl alcohol. The butanolic solution is washed with water, evaporated and the residue recrystallized from methanol+ether. The butyric acid analog of ferrichrysin of the Formula I, where $R_1$ represents hydrogen and $R_2$ propyl, forms fine yellow-orange needles which slowly decompose and turn black above 200° C. without melting. For paper chromatography, see Table 1. In the UV absorption spectrum in methanol a high end absorption is found at 220 m$\mu$ and a broad absorption maximum at 425–430 m$\mu$ (log $\epsilon$=3.5).

TABLE 1

|  | Rf (System I) | Rf (System II) |
|---|---|---|
| Ferrichrysin | 0.37 | 0.34 |
| Propionic acid analogon | 0.60 | 0.74 |
| Butyric acid analogon | 0.95 | 0.90 |
| (Fraction 83–103) | 0.84 | 0.93 |

What is claimed is:

1. Process for the manufacture of a member selected from the group consisting of desferrichrysin of the formula cyclo-[(glycyl)-(seryl)$_2$-(N$^\delta$ - acetyl - hydroxy-ornithyl)$_3$] and ferrichrysin, the corresponding ferriferous compound in which iron is bound in complex form to the 3-hydroxamic acid residues, wherein a member selected from the group consisting of *Aspergillus melleus* M 2853 and *Aspergillus terreus* M 4785 is grown under aerobic conditions in an aqueous nutrient solution containing a source of carbon and nitrogen as well as inorganic salts, and from the culture filtrate a member selected from the group consisting of ferrichrysin and desferrichrysin is isolated.

2. Process as claimed in claim 1, wherein an iron salt is added at the end of cultivation to convert any desferrichrysin present in the culture medium to ferrichrysin.

3. Process as claimed in claim 1, wherein desferrichrysin is obtained from the culture filtrate by adding an iron-complexing agent.

4. Process as claimed in claim 3, wherein 8-hydroxyquinoline is added to the culture filtrate.

5. Process as claimed in claim 1, wherein the iron is removed from ferrichrysin by means of a member selected from the group consisting of a mineral acid, a base and an iron-complexing agent.

6. Process for the manufacture of a member selected from the group consisting of a derivative of ferrichrysin of Formula I in which $R_1$ stands for hydrogen and $R_2$ for lower alkyl having from 2 to 6 carbon atoms and the corresponding iron-free compounds wherein desferrichrysin is desacetylated in a mildly acid medium, the resulting compound acylated with an acylating agent dervide from a lower alkanoic acid having from 3 to 7 carbon atoms and the O-acyl groups selectively split off.

7. Process according to claim 6, wherein the resulting acylated compound is partially desacylated with ammonia in methanol and reacted with an iron (III) salt.

8. Ferrichrysin, the ferriferous complex compound of cyclo-[(glycyl)-(seryl)$_2$-(N$^\delta$ -acetyl-hydroxy - ornithyl)$_3$] in which iron is bound in complex form to the 3-hydroxamic acid residues.

9. Desferrichrysin of the formula cyclo-[(glycyl)-(seryl)$_2$-(N$^\delta$-acetyl-hydroxy-ornithyl)$_3$].

10. Derivatives of ferrichrysin of the Formula I wherein $R_1$ represents a member selected from the group consisting of hydrogen and lower alkanoyl, and $R_2$ stands for a lower alkyl radical having 1–6 carbon atoms, $R_2$ having at least 2 carbon atoms if $R_1$ is hydrogen.

11. A derivative of ferrichrysin of Formula I, as claimed in claim 10, in which $R_1$ represents lower alkanoyl and $R_2$ represents methyl.

12. A derivative of ferrichrysin of Formula I, as claimed in claim 10, in which $R_1$ represents acetyl and $R_2$ represents methyl.

13. A compound of the Formula I, as claimed in claim 10, wherein $R_1$ represents hydrogen and $R_2$ a lower alkyl group having 2–6 carbon atoms.

14. A compound of the Formula I, as claimed in claim 10, wherein $R_1$ represents hydrogen and $R_2$ ethyl.

15. A compound of the Formula I, as claimed in claim 10, wherein $R_1$ is hydrogen and $R_2$ propyl.

16. Derivatives of desferrichrysin of the Formula II wherein $R_1$ represents a member selected from the group consisting of hydrogen and lower alkanoyl, and $R_2$ stands for a lower alkyl radical having 1-6 carbon atoms, $R_2$ having at least 2 carbon atoms if $R_1$ is hydrogen.

17. A derivative of desferrichrysin of Formula II, as claimed in claim 16, in which $R_1$ represents hydrogen and $R_2$ represents lower alkyl having from 2 to 6 carbon atoms.

18. A derivative of desferrichrysin of Formula II, as claimed in claim 16, in which $R_1$ represents lower alkanoyl and $R_2$ represents methyl.

References Cited

Cram et al., Org. Chem., 1959, page 76, 2nd Edition, McGraw-Hill Book Co., Inc.

Emery et al., Am. Chem. Soc. Journal, Vol. 83, 1961, pp. 1626–1628.

LEWIS GOTTS, *Primary Examiner.*

P. A. STITH, M. M. KASSENOFF,
*Assistant Examiners.*

UNITED STATES PATENT OFFICE
CERTIFICATE OF CORRECTION

Patent No. 3,342,795　　　　　　　　　　　　September 19, 1967

Ernst Gaeumann, deceased, by
Tino Gaeumann, legal representative et al.

It is hereby certified that error appears in the above numbered patent requiring correction and that the said Letters Patent should read as corrected below.

Column 14, line 29, for "dervide" read -- derived --; column 14, line 74 and column 15, line 2, for "R," each occurrence, read -- $R_1$ --.

Signed and sealed this 28th day of January 1969.

(SEAL)
Attest:

Edward M. Fletcher, Jr.　　　　　　　　　　　EDWARD J. BRENNER
Attesting Officer　　　　　　　　　　　　　　Commissioner of Patents